United States Patent [19]

Schneider

[11] 4,221,926

[45] Sep. 9, 1980

[54] METHOD OF MANUFACTURING WATERPROOF SHIELDED CABLE

[75] Inventor: Randy G. Schneider, Norcross, Ga.

[73] Assignee: Western Electric Company, Inc., New York, N.Y.

[21] Appl. No.: 945,715

[22] Filed: Sep. 25, 1978

[51] Int. Cl.[2] ...................... H01B 13/22; H01B 7/18; B32B 31/30; B29C 27/20

[52] U.S. Cl. ...................................... 174/107; 156/54; 156/56; 156/85; 156/86; 156/212; 156/244.12; 428/61; 428/296; 428/365; 428/910; 428/913

[58] Field of Search ...................... 29/628; 156/54, 55, 156/56, 84, 212, 213, 85, 86, 244.12; 174/107; 264/172; 428/61, 296, 365, 910, 913

[56] References Cited

U.S. PATENT DOCUMENTS

| | | | |
|---|---|---|---|
| 2,784,456 | 3/1957 | Grabenstein | 264/288 |
| 3,087,007 | 4/1963 | Jachimowicz | 156/54 X |
| 3,137,120 | 6/1964 | Budenbender | 156/54 X |
| 3,159,513 | 12/1964 | Baier | 156/49 |
| 3,733,225 | 5/1973 | Moody | 156/48 |
| 4,065,594 | 12/1977 | Shll et al. | 428/296 X |
| 4,075,419 | 2/1978 | Virkus | 174/107 |

*Primary Examiner*—John T. Goolkasian
*Assistant Examiner*—Robert A. Dawson
*Attorney, Agent, or Firm*—Robert B. Kennedy

[57] ABSTRACT

A waterproof shielded cable is disclosed having a metallic shield formed with a longitudinal seam surrounding a core. A strip of material overlays the metallic shield seam with side edges located to each side of the seam. An extruded plastic jacket overlays the metallic shield and strip of material with the jacket being in intimate contact with the shield and with a principle surface of the strip of material but spaced from the strip side edges.

A method is also disclosed for manufacturing a shielded cable which comprises the step of wrapping sheet metal about a cable core with the sheet metal edges overlapped to form a shield with a longitudinal seam. The shield seam is overlayed with a strip of material of a type characterized by being shrinkable when heated above a predetermined temperature, and with the strip edges straddling the shield seam. A plastic jacket is extruded onto the shielded core and strip of material at a temperature in excess of the predetermined temperature. The plastic jacket is cooled by conducting heat from the jacket into an ambient cooling medium and into the core through the strip of material and shield whereupon the strip of material becomes heated and shrinks drawing the strip edges towards the shield seam to leave gaps bounded by the strip edges, the shield and the jacket. During formation the gaps are filled with a flooding compound having a lower thermal conductivity than the surrounding materials.

9 Claims, 5 Drawing Figures

METHOD OF MANUFACTURING WATERPROOF SHIELDED CABLE

TECHNICAL FIELD

This invention relates to waterproof cables of the type having a metallic shield formed with a longitudinal seam wrapped about a cable core.

BACKGROUND OF THE INVENTION

Waterproof cables are today in wide usage in both the communication and power transmission fields. One such cable used in the telecommunications industry has a core formed by a bundle of insulated wires which are encased within a tubular, metallic shield that enhances the structural integrity of the cable. The tubular shield is itself encased within an extruded polymer jacket that provides a waterproof covering.

To insure the structural integrity of the cable the shield should completely surround the core so as not to leave a longitudinal gap therebetween. In order to accomplish this the edges of the sheet metal are mutually overlapped as they are wrapped about the core into a generally hollow, cylindrical configuration. The exterior surface of the shield is thereby formed with a longitudinal seam providing by the outer, overlapping shield edge.

Once the core has been so shielded it is passed through an extruder which extrudes a cylindrical layer of a plastic such as polyethylene at an elevated temperature about the shielded core. This outer layer is then cooled whereupon the plastic solidifies into a cylindrical, waterproof jacket. When this occurs the inside surface of the jacket tends to assume the generally cylindrical configuration of that of the exterior surface of the metallic shield. Over the longitudinal seam of the shield however the jacket assumes a slight, but nevertheless distinct, steplike configuration over the exposed shield edge. In this manner a longitudinal discontinuity is formed along the inner surface of the extruded jacket.

Once the shield cable has been so manufactured it may become subjected to quite rough handling in the field. For example, where the cable is entrenched it is conventionally done so with a specialized cable laying plow. During this operation the cable is drawn off of a reel supported above ground and then directed in a generally vertical direction downwardly to the plow. At the plow the cable is rather abruptly redirected in a generally horizontal direction. This redirectioning of the cable causes it briefly to assume approximately a right angle turn or bend as shown in the side view of FIG. 4. This bending action causes the cable, which normally is of cylindrical configuration, momentarily to assume an eliptical cross-sectional configuration along a plane P as illustrated. The jacket portion of the cable at this point is thus subjected to substantial tensil forces along this plane. These forces can cause the jacket to form a split or rupture R as shown in FIG. 5. If the rotary orientation of the cable at this point happens to be such as to locate the previously described longitudinal discontinuity along the inside surface of the jacket at the convex, lower surface 10 of the cable, the probability of such a rupture occuring is quite substantial. It therefore is desirable to prevent any such discontinuity from being formed along the inside surface of the jacket over the shield seam during cable manufacture.

In an effort to overcome the just described problem a strip of laminated tape made of aluminum foil, Kraft paper, and Mylar film has heretofore been used in waterproof cable manufacture as an overlay to cover the shield seam. This strip of tape has inhibited the formation of a step along the inside surface of the jacket immediately above the overlapped, exposed edge of the shield seam. However, the side edges of the tape itself, located to each side of the seam, have themselves caused steps to be formed along the inner surface of the jacket. Indeed, where only one step was before present, use of the seam tape has led to the formation of two steps although of lesser height. In power cables, which are subjected to rapid changes in temperature and size over their lives resulting from cable usage, the edges of such seam covering tape have been tapered so as to provide a streamlined or feathered contour. This tape however is quite costly since it cannot be manufactured in master roll form but instead must be extruded in individual tape form.

Accordingly, it is a general object of the present invention to provide an improved cable of the type having a jacket extruded over a metallic shield formed with a longitudinal seam.

Another general object of the invention is to provide a method of manufacturing a shielded cable of the type just described.

More specifically, it is an object of the invention to provide a cable having an extruded jacket overlaying a metallic shield having a longitudinal seam with the inside surface of the jacket having a smooth contour over the shield seam.

Another object of the invention is to provide a method of manufacturing a cable having a metallic shield formed with a longitudinal seam about a cable core overlayed with a plastic jacket having a smoothly contoured inside surface overlaying the shield seam.

Still another object of the invention is to provide a cable and a method of making the same of the type described which is of relatively simple and economic construction and which is readily compatible with existing cable structures and manufacturing techniques.

SUMMARY OF THE INVENTION

In one form of the invention a cable is provided comprising a core and a metallic shield surrounding the core formed with a longitudinal shield seam. A strip of material overlays the metallic shield seam with side edges located to each side of the seam. An extruded plastic jacket overlays the metallic shield and strip of material with the jacket being in intimate contact with the shield and with a principle surface of the strip of material but spaced from the strip of material side edges.

In another preferred form of the invention a cable is provided having a metallic shield surrounding a core formed with a longitudinal seam, and an extruded plastic jacket surrounding the metallic shield. A strip of material is located between the metallic shield and plastic jacket overlaying the shield seam with side edges straddling the seam. The strip of material is characterized by being shrinkable when heated to its softening temperature whereby during manufacture its side edges may be drawn towards the shield seam leaving the plastic jacket with a smooth surface adjacent the strip side edges.

In yet another preferred form of the invention a method is provided for manufacturing a shielded cable wherein sheet metal is wrapped about a cable core with the sheet metal edges overlapped to form a shield with a longitudinal seam. The shield seam is overlayed with a strip of material of a type characterized by being shrinkable when heated above a predetermined temperature and with the strip edges straddling the shield seam. The shielded cable with seam overlaying strip is flooded with a flooding compound having lower thermal conductivity than the plastic jacket and the strip of material. A plastic jacket is then extruded onto the shielded core and strip of material at a temperature in excess of said predetermined temperature.

DESCRIPTION OF THE PREFERRED EMBODIMENTS

Figure 1:
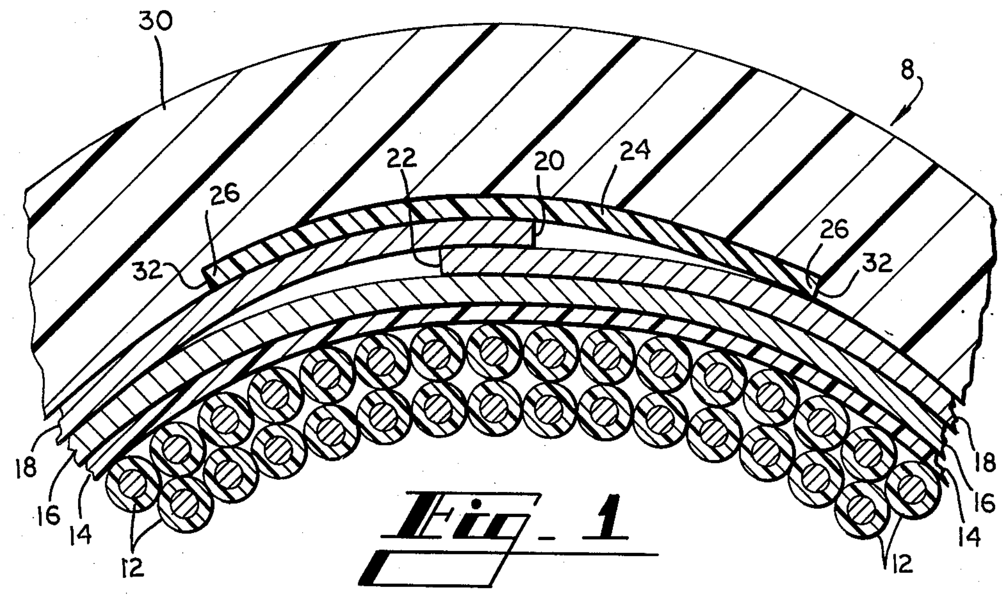
FIG. 1 is a partial transverse cross-sectional view of a waterproof shielded cable of the prior art.

Referring now in more detail to be drawing, there is shown in the FIG. 1 a waterproof, shielded cable 8 of the prior art comprising a central core formed by a generally cylindrical, compact array of insulated conductors 12. For clarity only a portion of the cylindrical cable is shown here. The conductors are wrapped within a thin sheet of polyester such as Mylar which forms a core wrap 14. This core wrap serves to provide a dielectric barrier and heat sheidl which protects the conductors during high temperature extrusion of an outer jacket about the core. The core wrap 14 itself is overlayed with a lightning shield 16 in the form of thin aluminum tape. Typically the longitudinal edges of the tape are spaced slightly apart to form a small gap therebetween at some radial location.

With continued reference to FIG. 1 the cable is further seen to be formed with an outer shield 18 composed of a strong metal such as black plate steel which is wrapped about the lightning shield 16. This outer shield 18 provides the cable with structural strength. It is wrapped about the core over the lightning shield tape in a generally cylindrical configuration with one longitudinal edge 20 overlaying another longitudinal edge 22 thereby forming a shield seam. The shield seam itself is seen to be overlayed with a strip of tape 24. The tape is typically of a laminated structure referred to as AKM tape which is composed of aluminum foil, Kraft paper, and Mylar film with the aluminum foil layer usually disposed distal the shield seam. The side edges 26 of the AKM tape 24 are seen to be located so as to straddle the seam of the outer shield 18.

After the AKM tape has been applied over the top of the shield seam it is bound snugly in place by unshown cord would helically over the outer shield and tape. The partially formed cable is flooded with a flooding compound. The shielded cable is then passed through an extruder which applies a low density polyethylene overlay cylindrically about the shielded core to form a waterproof jacket 30. By low density is meant a material with a density of less than 0.94 gm/cc of polyethylene. The polyethylene material is extruded onto the shielded core at a temperature of some 450° F. at a time when the core itself is typically at some 130°–140° F. From the extruder the cable is passed through a liquid cooling bath whereupon heat from the extruded layer of polyethylene is conducted to the ambient cooling medium about the jacket and also, although to a substantially lesser extent, inwardly into the cable core. The cooling of the polyethylene layer causes it to solidify into the jacket 30. In so solidifying the inside surface of the jacket assumes a generally cylindrical configuration about the outer shield 18. The presence of the tape over the shield seam however inhibits the inner surface of the jacket 30 from being formed with a step contiguous with the shield edge 20 which would provide a structural discontinuity. Nevertheless, from FIG. 1 it may be seen that the jacket does have two steps 32 over the side edges of tape 24 itself which the present invention seeks to eliminate. An exemplary set of thicknesses of the various layers forming the shielded cable shown in FIG. 1 are as follows:

Table I

| | |
|---|---|
| Core Wrap 14 | 3 mils |
| Lightning Shield 16 | 8 mils |
| Steel Shield 18 | 6 mils |
| AKM Tape 24 | 6 mils |
| Polyethylene Jacket 30 | 75 mils |

Figure 2:
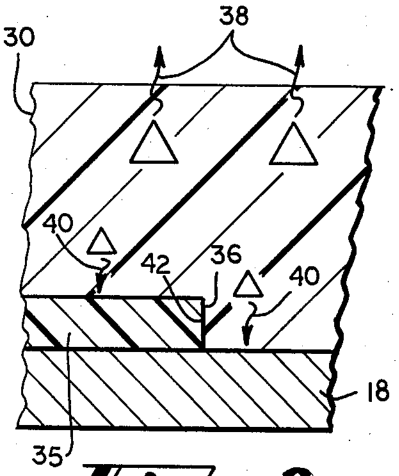
FIG. 2 is an enlarged, transverse cross-sectional view of a portion of a waterproof shielded cable illustrating a transient relative position of selected cable components during manufacture in accordance with the present invention.
Figure 3:
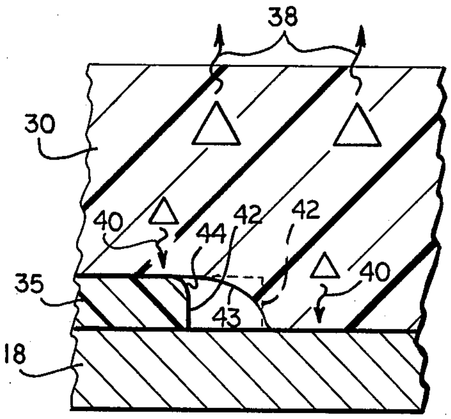
FIG. 3 is another transverse cross-sectional view of the portion of the waterproof shielded cable shown in FIG. 2 after manufacture.
Figure 4:
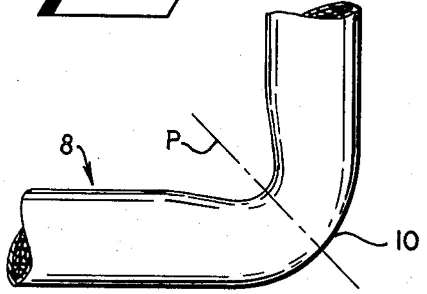
FIG. 4 is a side elevational view of a bent portion of a waterproof shielded cable.
Figure 5:
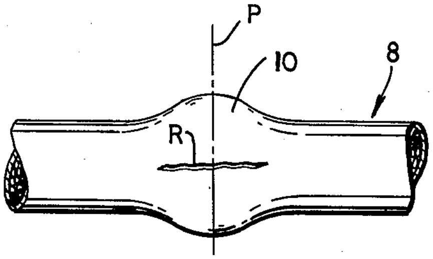
FIG. 5 is an inclined planar view of the bend cable shown in FIG. 4.

A cable formed in accordance with principles of the present invention may be of the same structural and material composition as that shown in FIG. 1 with one important exception. That exception lies in the composition of the tape 24 which overlays the outer steel shield seam. In accordance with the present invention the AKM tape is replaced and substituted by a strip of molecularly oriented polyolefin 35 as shown in FIGS. 2 and 3 such as a spunbonded, high density polyethylene fibrous material or a biaxially oriented polypropylene film. By high density here is meant a material density in excess of 0.94 gm/cc. These materials possess the unique attribute of being shrinkable when heated to their softening temperatures. This characteristic of the polyethylene fibrous material results from the molecular orientation of the individual fibers. In forming a sheet of the material oriented fibers are spunbonded causing them to assume a serpentine configuration in the plane of the sheet. Upon being heated to the material softening temperature, which is well above the glass transition temperature but below the melting temperature, the serpentine orientations relax whereupon the fibers seek to disorient themselves laterally in contraction in the plane of the sheet material. As a result the material shrinks rather than expands with heating drawing its lateral edges inwardly towards the center of the sheet.

A preferred example of material useful in providing strip 35 is Tyvek spunbonded high density polyethylene oriented fiber sheet manufactured by the E. I DuPont Company of Wilmington, Deleware which at present is used for wall papering, book covers and spring wrap for its property of toughness. A preferred example of the polypropylene film type material is biaxial oriented polypropylene film manufactured by Trea Industries of North Kingstown, Rhode Island which is presently used in the packaging industry. With Tyvek the individual fibers are oriented whereas with the Trea material the film itself is stretched to effect biaxial orientation of the molecules. Another material possessing this attribute which has been studied is Typar spunbonded polypropylene oriented fiber sheet also manufactured by the E. I. DuPont Company which at presently is used for rug upholstery backing. This last material however has been found to have relatively coarse fibers that can themselves form discontinuities in the inner surface of an extruded cable jacket. It therefore is not recommended. All of these exemplary materials however do shrink laterally towards the strip center during the extrusion of jacket 30 onto the cable core. This action serves to prevent abrupt steps from being formed in the inner surface of the jacket as now explained.

With reference next to FIG. 2 it will be seen that when the polyethylene material is initially extruded over the shield 18 and the molecularly oriented strip of material 35 it is brought into intimate contact with the exterior surfaces of the tape and shield thereby forming a step 36 in the liquified body of polyethylene as shown in FIG. 2. Promptly thereafter the cable is passed into a cooling medium whereupon heat is conducted out of the polyethylene material and into the ambient cooling medium as schematically indicated by arrows 38. At the same time heat is also conducted inwardly into the core through the strip of material 35 and steel shield 18 as indicated by arrows 40. This action causes the temperature of the strip of material 35 to become elevated above its softening temperature which, in the case of Tyvek for example, is approximately 260° F. This causes the strip of material 35 to shrink laterally whereupon its side edges 42 move from their initial position as shown in solid lines in FIG. 2 and in broken lines in FIG. 3 to their permanent position 42 as shown in solid lines in FIG. 3. As this occurs there typically will be a slight rounding of the corner 44 of edge 42 facing the outer jacket. Of course, the other unshown side edge of the material 35 simultaneously behaves in the same manner as illustrated here.

During this peiod some of the polyethylene will follow the receeding movement of the shrinking strip of material 35. However, the jacket will become cooled to such degree as to solidify before it is able to completely fill the gaps being formed between the shrinking side edges of the strip 35 and jacket into which flooding compound flows. Consequently, flooding compound filled gaps are formed between the strip of material side edges 42 and the polyethylene surface 43 facing the edges 42. The resulting surfaces 43 of the jacket are thus seen to be of generally smooth contour as shown in FIG. 3.

During the just described manufacturing process the flooding compound, which typically is either a mixture of asphalt, rubber and clay or an amorphous polypropylene such as that sold by Hercules, Inc. of Wilmington, Delaware, does play an important role. As is well known flooding compounds are conventionally used during the fabrication of cable. The compound, which is in liquid state when applied, floods the various voids throughout the cable during manufacture. Once the cable is cooled the flooding compound solidifies to a pliable state providing a void filler as a longitudinal water block and a corrosion inhibitor.

With the present process the flooding compound provides an important new function in addition to those which it conventionally provides. Specifically, the flooding compound, due to its very low overall heat transfer coefficient, is believed to act as a heat shield to prevent immediate shrinkage of the molecularly oriented strip of material 35 during the overlayed polyethylene extrusion. Its presence serves to cause the surface of the extrusion that is following the receeding sdes of the strip 35 to cool sufficiently as the adjacent strip shrinks thereby assuming the smooth surface contour shown in FIG. 3 upon solidification. Thus, without the presence of flooding compound the jacket extrusion could follow the receeding side edges of the strip and thereby remain contiguous once recession had terminated and solidification taken place. In such event a step-like discontinuity would, of course, again be formed.

Various conventional thermoplastic flooding compounds may be used. They should however exhibit low thermal conductivity relative to that of the shrinkable strip and the polyethylene jacket. They also should not volitize at the temperature of the extrusion and remain in a liquid state until the jacket has solidified during cooling. As cooling progresses the flooding compound assumes a pliably solid state within the gaps aside the shrunked strip.

It should therefore now be apparent that a substantially improved waterproof cable is provided of the type having a jacket extruded over a metallic shield formed with a longitudinal seam, and method of making same. The new cable and manufacturing method does not necessarily mandate any change in the size, location or composition of any of the cable components of the prior art save that of a strip of material overlaying the shield seam. Nor is any other alteration in current manufacturing techniques required. The resulting cable has a waterproof jacket formed without substantial inside surface discontinuities over the shield seam that could lead to jacket rupture which is formable in a simple and economic but unique manner.

It should be understood that the just describd embodiments merely illustrate principles of the invention in preferred forms. Many modifications, additions and deletions may, of course, be made thereto without departure from the spirit and scope of the invention as set forth in the following claims.

What is claimed is:

1. A method of manufacturing a shielded cable comprising the steps of:

(a) wrapping sheet metal about a cable core with the sheet metal edges overlapped to form a shield with a longitudinal seam;

(b) overlaying the shield seam with a strip of material of a type characterized by being shrinkable when heated above a predetermined temperature with the strip edges straddling the shield seam;

(c) extruding a plastic jacket onto the shielded core and strip of material at a temperaure in excess of said predetermined temperature; and (d) cooling the plastic jacket by conducting heat from the jacket into an ambient medium and into the core through the strip of material and shield whereupon the strip of material becomes heated and shrinks drawing the edges towards the shield seam to leave gaps bounded by the strip edges, the shield and the jacket.

2. The method of manufacturing a shielded cable in accordance with claim 1 wherein step (b) the shield seam is overlayed with a strip of material comprised of a plastic that is molecularly biaxially oriented in the plane of the strip.

3. The method of manufacturing a shielded cable in accordance with claim 2 wherein step (b) the shield seam is overlayed with a strip of material comprised of a spunbonded high density polyethylene.

4. The method of manufacturing a shielding cable in accordance with claim 1 wherein simultaneously with step (c) the shielded core and strip of material are flooded with a flooding compound of a type characterized by being in a liquid state at said predetermined temperature and having lower thermal conductivity than the plastic jacket and the strip of material.

5. In a cable having a metallic shield surrounding a core and formed with a longitudinal seam, an extruded plastic jacket surrounding the metallic shield, and a strip of material positioned between the shield seam and the plastic jacket with side edges straddling the seam, the improvement comprising said strip of material being shrinkable when heated to its softening temperature, whereby during cable manufacture the side edges of the strip of material may be drawn towards the shield seam leaving the plastic jacket with a smooth surface adjacent the strip side edges.

6. The cable improvement of claim 5 wherein said strip of material is composed substantially of a molecularly biaxial oriented plastic.

7. The cable improvement of claim 5 wherein said strip of material is composed substantially of a polyolefin.

8. The cable improvement of claim 7 wherein said strip of material is composed of a spunbonded high density polyethylene.

9. The cable improvement of claim 5 wherein said strip material is comprised of a mass of molecularly oriented fibers of serpentine configuration.

* * * * *